Sept. 14, 1965      M. G. HAGLE      3,205,638
METHOD AND APPARATUS FOR DEHYDRATION OF GASES
Filed June 12, 1963
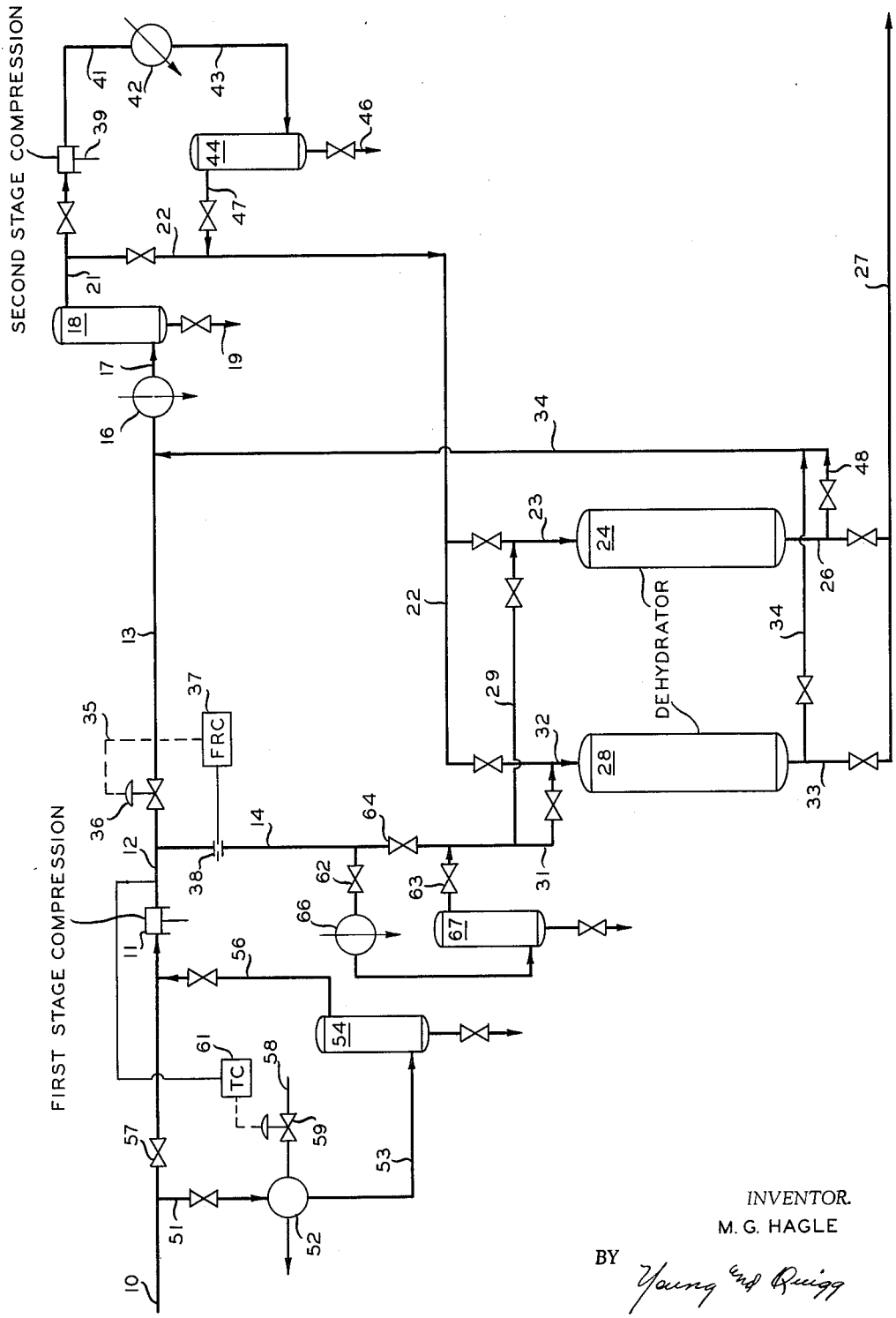
INVENTOR.
M. G. HAGLE
BY *Young and Quigg*
ATTORNEYS United States Patent Office 3,205,638
Patented Sept. 14, 1965

3,205,638
METHOD AND APPARATUS FOR
DEHYDRATION OF GASES
Melvin G. Hagle, Borger, Tex., assignor to Phillips
Petroleum Company, a corporation of Delaware
Filed June 12, 1963, Ser. No. 287,356
10 Claims. (Cl. 55—20)

This application relates to a method and apparatus for the dehydration of gases. In one aspect this invention relates to a method and an apparatus for the regeneration of used or spent desiccant which has been employed in the dehydration of gases.

It is frequently desirable and often necessary to remove either the greater portion of water or the last traces of moisture from gases. For example, in natural gas pipeline transmission systems hydrate formation can be eliminated by removing a sufficient amount of the water vapor so that the dew point of the gas is at least as low as the minimum temperature to which the gas will be exposed at the maximum pressure utilized in the system. Also, many processes wherein gases such as air or low molecular weight hydrocarbons are used as reagents require that said gases be essentially anhydrous. Even in situations where the gas is not utilized as a reagent, such as in pneumatic control systems where so-called instrument air is employed as the power fluid, it is required that the air be essentially anhydrous in order to avoid ice formation during winter conditions.

It is known that adsorbent materials such as bauxite, activated alumina, silica gel, and the like have desiccating properties, and that such materials can be reactivated and reused by heating same to desorb the adsorbed water. Fluids to be dehydrated are passed through beds of these granular adsorbent desiccants to obtain a degree of water removal depending on the adsorptive capacity of the desiccant. Such materials are often superior to solutions of inorganic salts or organic compounds, particularly for treating fluids which are miscible and/or reactive with such solutions or which must be substantially completely dehydrated. In order to increase the capacity of a bed of a desiccant and lengthen its dehydration service, hygroscopic salts can be added and distributed over the adsorbent granules in such a manner that the adsorptive capacity of the desiccant is utilized to retain the solution and/or hydrate of the hygroscopic salt.

The above-mentioned adsorbents have a limited capacity for water, and require reactivation or regeneration, which involves heating the entire bed and sweeping out the adsorbed water which is desorbed at the reactivation temperature. In accordance with conventional practice, solid desiccant materials which have become inactive due to adsorption of water are regenerated by heating the desiccant with hot gases. The hot gases are passed through the desiccant from which they extract the water as water vapor. The regeneration gases containing said water vapor are either wasted or cooled below the dew point to condense the water vapor therein. In the latter instance the aqueous condensate is withdrawn and the gases are passed to a compressor or circulating blower after which they are heated to a suitable regeneration temperature and again passed into contact with the solid desiccant material. This cycle of operation is carried out continuously until the desired regeneration is obtained.

In gas dehydration systems it is desirable, if possible, to utilize for regenerating the desiccant the same gases as those being dehydrated. This obviates the necessity of having available a separate source of inert gases for the regeneration operation and eliminates any problems of detrimental effects on the desiccant due to the composition of the gases. It is also desirable that the regeneration of the desiccant be carried out under substantially constant conditions of temperature, pressure, and volume of gas passed through the desiccant during the regeneration period. Regenerating the desiccant under substantially the same pressure as employed in the dehydration cycle will, in many instances, eliminate the necessity for extra blowers or compressors. Regeneration of the desiccant at a substantially constant controlled temperature is particularly important. If the temperature of the regeneration gases is not high enough, the regeneration will be incomplete or inefficient. If the temperature of the regeneration gases is too high, there is danger of overheating and damaging the desiccant.

United States Patent 2,629,460, issued February 24, 1953, to C. J. Maki, discloses and claims a process for the dehydration of fluids which eliminates many of the above-described difficulties and thus represents a marked advance in the art. The present invention provides a method and apparatus for overcoming all of the above-described difficulties and thus provides an improvement over the invention of said Maki patent.

In prior art processes, heat is supplied to the regeneration gases by passing same through a heater such as a furnace or a heat exchanger. This has required the expense of providing adequate heating equipment. In a great many instances the gases being dehydrated are subsequently utilized at superatmospheric pressures. I have now discovered that in many instances the heat of compression, i.e., the heat imparted to the gas during compression thereof, is sufficient to effectively and efficiently regenerate the desiccant employed in dehydrating the gas, and it is not necessary to provide independent heating means. I have further discovered that utilizing the heat of compression as the source of heat for the regeneration gas provides very effective temperature control in the regeneration process in that the regeneration gas can be supplied at substantially constant temperature.

Thus, broadly speaking, the present invention resides in (1) a method of regenerating a desiccant previously employed in the dehydration of fluids wherein the heat of compression imparted to the regeneration gases during the compression of same is utilized as the sole source of heat, and (2) apparatus for carrying out said method.

Thus, an object of this invention is to provide a method and an apparatus of regenerating spent or moisture-laden desiccant wherein the sole source of heat is the heat of compression imparted to the regeneration gas during the compression thereof. Another object of this invention is to provide a method and an apparatus for dehydrating gases containing water. Another object of this invention is to provide a method and an apparatus for dehydrating gases wherein gases can be dehydrated in either the gaseous state or the liquid state. Still another object of this invention is to provide a method and apparatus for dehydrating gases wherein the gases used for regenerating the desiccant are the same gases as those being dehydrated and the heat of compression imparted to said gases during compression thereof is the sole source of heat in the regeneration portion of the cycle. Other aspects, objects, and advantages of the invention will be apparent to those skilled in the art in view of this disclosure.

Thus, according to the invention there is provided a method for regenerating a moisture-laden desiccant, which method comprises: compressing a gas to a pressure such that the compressed gas has a temperature within the range of from 250 to 600° F.; passing at least a portion of said compressed gas through a body of said moisture-laden desiccant for a period of time sufficient to heat same to a temperature above its moisture desorbing temperature and effect a regeneration thereof; and thereafter cooling said desiccant.

Further according to the invention, there is provided a process for the dehydration of a gas, wherein at least two dehydration zones are employed, which process comprises: compressing said gas in a first compressor to a pressure such that the temperature of the compressed gas is within the range of from 250 to 600° F.; passing a portion of said hot compressed gas through a first dehydration zone containing a body of moisture-laden desiccant for a period of time sufficient to heat same to a temperature above its moisture desorbing temperature and effect a regeneration thereof; combining moisture-laden gas withdrawn from said first dehydration zone with the remainder of said compressed gas and passing the combined stream through a cooler to condense moisture therefrom; passing the effluent from said cooler to a separation zone and therein separating condensed moisture from said effluent; and passing gaseous effluent from said separation zone through a second dehydration zone, containing active desiccant, to at least partially dehydrate same.

Still further according to the invention, there are provided combinations of apparatus which can be employed in practicing the methods of the invention.

It is to be noted that in the regeneration of the spent or moisture-laden desiccant the heat of compression imparted to the gas during the compression thereof is the sole source of heat in the regeneration gas. This utilization of the heat of compression as the source of heat has several advantages. The expense of providing independent heating means is eliminated. Utilizing the heat of compression as the source of heat increases the over-all efficiency of the process because said heat is available and would otherwise be wasted, since the gases are compressed in any event. Utilizing the heat of compression as the sole source of heat makes it possible to readily regenerate the spent desiccant at substantially constant conditions of temperature and pressure which, as explained above, increases the efficiency of the process and eliminates danger of overheating and damaging the desiccant. A further advantage of regeneration under constant conditions of temperature and pressure is that the regeneration portion of the operating cycle is more uniform from the standpoint of time and in those systems wherein a plurality of dehydrators are employed with alternate on-stream and regeneration periods, a dehydrator containing regenerated desiccant will always be available when the desiccant in the on-stream dehydrator becomes spent. Still another advantage of the invention is that the gases can be dehydrated either in the gaseous state or in the liquid state.

In the practice of the invention, the temperature of the regeneration gas can be within the range of about 250 to about 600° F. depending upon the type of desiccant employed. The preferred range is from about 350 to about 500° F. when employing desiccant such as bauxite and silica gel. The inlet gas to the system is compressed sufficiently to obtain the desired temperature. Said gas will usually be compressed to a pressure within the range of from 50 to 1000 p.s.i.g, although it is within the scope of the invention to utilize pressures outside this range, particularly higher pressures. As will be evident to those skilled in the art in view of this disclosure, the pressure to which the gas is compressed will depend upon the type of desiccant employed, the temperature desired in the regeneration gases, the particular dehydration system being employed, and the subsequent utilization of the gas being dehydrated. The following table illustrates the increase in temperature upon compression for air and for natural gas (methane).

*TABLE I*

| Gas | Initial Conditions | | Final Conditions | | Compression Ratio |
|---|---|---|---|---|---|
| | Temp., °F. | Pressure, p.s.i.a. | Temp., °F. | Pressure, p.s.i.a. | |
| Ai | 90 | 15 | 360 | 60 | 4:1 |
| Do | 90 | 15 | 295 | 45 | 3:1 |
| Do | 90 | 15 | 600 | 150 | 10:1 |
| Do | 90 | 15 | 495 | 105 | 7:1 |
| Methane | 50 | 50 | 215 | 200 | 4:1 |
| Do | 100 | 100 | 315 | 500 | 5:1 |
| Do | 140 | 150 | 410 | 900 | 6:1 |

The adsorbent materials that can be used in the practice of the invention are preferably such natural substances as bauxite, fuller's earth, and acid clay, although excellent results are obtained at somewhat higher cost with such synthetic adsorbents as activated alumina and silica gel. These adsorbent materials may be activated before use by calcining at temperatures of 500 to 1500° F. The granular adsorbent materials are used in suitable particle size for permitting fluid flow without excessive pressure drop even in relatively deep beds and at flow rates consistent with efficient hydration.

The hygroscopic salts referred to above are of that class which are substantially inert toward the fluids treated and which have an affinity for water at the temperature range of the drying bed. These salts can be substantially dehydrated at the temperatures used for reactivation of the desiccant composition. Of these salts, the preferred one for this invention is lithium chloride. Other salts which are useful are calcium chloride, magnesium sulfate, and magnesium chloride, and others having strong hydrate-forming tendencies.

This invention is applicable to the drying of such gases as air, oxygen, hydrogen, helium, butane, propane, natural gas, and by-product gas. This invention is applicable to the drying of gases containing small amounts of water vapor as well as gases which are saturated with water vapor in the range of temperatures and pressures specified hereinafter for the operating conditions in the dehydration vessels. The extent of drying can be carried to any desired level ranging from the water content of the incoming gas to substantially complete dryness.

Referring now to the drawing, the invention will be more fully explained. In one embodiment of the invention, a gas to be dehydrated is passed through inlet conduit 10 to compressor 11 having discharge conduit 12 connected thereto. The gas entering said compressor will usually be at a relatively low pressure such as from about atmospheric to about 50 p.s.i.g. and at a temperature ranging from about 0 to about 100° F., more usually from about 50 to about 90° F. Said gas will contain a substantial amount of water vapor and in many instances will be saturated with water vapor at the existing conditions of temperature and pressure. In said compressor, said gas will be compressed to a compression ratio within the range of from about 3:1 to about 10:1, preferably about 4:1 to about 7:1, depending upon the initial temperature and pressure of said gas. However, the pressure to which the gas is compressed in compressor 11 is always lower than the pressure necessary to liquefy the gas. The compressed gas will have a temperature within the range of from about 250 to about 600° F., preferably 350 to 500° F.

Said compressed gas in discharge conduit 12 is divided into a process stream which is passed through conduit 13 and a regeneration gas stream which is passed through conduit 14. The division of said compressed gas can be in any suitable proportions but for economic reasons said process gas stream will comprise a major portion, i.e., more than 50 volume percent of said compressed gas and said regeneration gas stream will comprise a minor portion, i.e., less than 50 volume percent of said compressed gas, usually within the range of from 15 to 30 volume percent. The back pressure or resistance to flow in conduit 13 is maintained lower than the pressure in conduit 34, but sufficiently high to insure constant flow through conduit 14. Said process gas stream is passed through cooler 16 wherein the temperature thereof is reduced, preferably to within the range of from 33 to 100° F. Higher temperatures can be utilized but the efficiency and extent of dehydration is impaired thereby due to the increased vapor pressure of water in the desiccant with increasing temperature. The cooled process stream is then passed via conduit 17 into separator 18 from which any water which is condensed in cooler 16 can be separated from the gas and withdrawn via conduit 19. Said separator 18 can be any suitable means for allowing or effecting a phase separation between the gaseous mixture and the aqueous condensate, such as a settling tank or tower, and phase separation can be accomplished either by gravitational or centrifugal methods.

Gas is withdrawn from the upper portion of separator 18 via conduit 21 and passed via conduits 22 and 23 into a dehydration zone, here represented by dehydrator 24. While said dehydration zone is here illustrated as comprising a single dehydrator 24, it will be understood to be within the scope of the invention to employ a plurality of such dehydrators as said dehydration zone, said plurality of dehydrators being manifolded in known conventional manner for either parallel or series flow. In said dehydrator 24, the gaseous mixture contacts a suitable solid particulate desiccant, such as bauxite, in known manner. The treated gaseous mixture, substantially free of water vapor, e.g., having a water vapor dew point below about −40° F. at the highest pressure which it is expected said gas will be utilized, is removed from said dehydrator 24 via conduits 26 and 27 and passed to storage or other use.

The contact zone or dehydration zone here illustrated by dehydrator 28 has previously been used for dehydrating the gas being treated and the desiccant therein is therefore incapable of dehydrating the gas to the required reduced water content. In order to regenerate the spent or moisure-laden desiccant in said dehydrator 28, the minor portion of the hot compressed gases in conduit 14, referred to above as regeneration gas, is passed via conduits 29, 31, and 32 into said dehydrator 28. As mentioned above, the temperature of said regeneration gas will be within the range of from about 250 to about 600° F. The actual regeneration temperature of the bauxite desiccant in dehydrator 28 is about 230° F. but in order to effect efficient and essentially complete regeneration thereof a temperature above about 350° F. should be utilized. The gaseous effluent from dehydrator 28 containing water vapor obtained from the regeneration of the desiccant therein is withdrawn via conduit 33 and passed via conduit 34 into conduit 13 at a point downstream from flow control valve 36 and upstream of cooler 16. The resulting combined stream is then passed through cooler 16, separator 18, and conduits 22 and 23 for dehydration in dehydrator 24 as previously described for said process gas stream.

When the desiccant in dehydrator 28 has been regenerated, as indicated by a cessation of or a marked decrease in the amount of water withdrawn from separator 18, the hot desiccant is cooled. This is accomplished by opening valves 62 and 63, closing valve 64, and passing regeneration gas from conduit 14 through cooler 66 and separator 67. The cooled regeneration gas is passed through dehydrator 28 until the desiccant therein has been cooled to about 100–150° F., after which the flow of gas is stopped and the dehydrator 24 is blocked in until needed for dehydration of the process gas stream.

After the desiccant in dehydrator 24 has become incapable of dehydrating the gas to the desired extent and the desiccant in dehydrator 28 has been regenerated, the gas mixture in conduit 22 is switched from conduit 23 and passed via conduit 32 through dehydrator 28 and dehydrator 24 is removed from process flow. Regeneration gas in conduit 29 is then passed via conduit 23 through dehydrator 24 for the necessary period of time to regenerate the desiccant therein while dehydrator 28 is on the process flow. The regeneration gas being passed through dehydrator 24 is withdrawn therefrom via conduits 26 and 48 and passed into conduit 34 for combining with the process gas in conduit 13, and dehydration as previously described. Dehydrated gases from dehydrator 28 are passed via conduit 33 into conduit 27 as product of the process.

The operation of flow control valve 36 is controlled in known manner by rate of flow controller 37 operatively connected thereto in known manner by transmission means 35, and also operatively connected to meter or orifice 38 disposed in conduit 14. Said rate of flow controller 37 and orifice 38 are sometimes considered as a unit and referred to as a meter. Said rate of flow controller 37 functions to maintain constant the rate of flow in conduit 14 by regulating the opening and closing of valve 36 in conduit 13. Division of the compressed gas stream in conduit 12 and passage of a portion thereof through conduit 14 will automatically serve to reduce the pressure in conduit 13. So long as sufficient gas is available in discharge conduit 12 a constant volume of gas wall be passed through conduit 14, regardless of the demand or delivery requirements for dehydrated gas, because rate of flow controller 37 operates to open or close valve 36, as necessary to insure that the desired amount of gas always passes through said conduit 14. The flow control valve on the process stream is so regulated that the back pressure on the source of the gas or the resistance to the flow of the gas in the process stream is sufficiently high at all times to maintain a constant flow in the regeneration stream. Since no compressors or blowers are used in the regeneration stream and since the regeneration stream is recirculated to the process stream, a progressively decreasing pressure exists on the regeneration stream caused by the resistance to flow through the regeneration circuit. The overall pressure drop on the regeneration circuit is relatively small and amounts to only a few pounds per square inch, usually less than 20 pounds.

The orifice type flow meter represented by orifice 38 and rate of flow controller 37 as described above can be replaced by other conventional types of differential pressure flow meters such as a venturi tube type, a flow nozzle type, or a Pitot tube type. Area meters, rotameters, antimanometers, electrical meters, and volumetric flow type meters can be employed for measuring the flow through conduit 14 without departing from the scope of this invention. Various other means other than air can be used to actuate valve 36. Such means include liquid and an electrically operated valve. Further details concerning the operation of valve 36 and rate of flow controller 37 can be found in said Maki Patent 2,629,460.

In another embodiment of the invention, and wherein the dehydrated gases from dehydrators 24 or 28 are to be subsequently utilized at a pressure greater than that produced in compressor 11, the gas from separator 18 is passed via conduit 21 into a second compressor 39 wherein the pressure thereof can be increased to the desired operating pressure. In many instances, said desired operating pressure will be less than that required to liquefy the gas. However, it is within the scope of the invention when utilizing second compressor 39 to compress said gases to the point where they are liquid. This is possible because the desiccants employed in dehydrators 24 and 28 are capable of dehydrating liquids as well as gases. However, said desiccants can be generated only by gaseous regeneration methods.

Employing second compressor 39 provides great flexibility to the invention. Thus, the gas can be in the gaseous state at its source (conduit 10), can be compressed sufficiently in compressor 11 to supply heat to the regeneration gas stream, can then be dehydrated at only a slightly reduced pressure if desired, or the pressure can be increased in compressor 39 to any desired pressure, even sufficient to liquefy the gases. This is highly advantageous in situations where the gases, such as the hydrocarbons ethane, propane, and butane, are gaseous at the source and it is desired to utilize said hydrocarbons in the liquid state. It will be understood that said first compressor 11 and said second compressor 39 can be the first and second stages of one compressor.

The compressed gases from compressor 39, either in the gaseous state or in the liquid state, are passed via discharge conduit 41 through cooler 42 wherein said gases are cooled to a temperature which is preferably within the range of 33 to 100° F. and passed via conduit 43 into separator 44. Said separator 44 can be of the same type as previously described separator 18 and a phase separation between condensed water and the compressed gases is effected therein with the water being withdrawn via valve conduit 46. Said compressed gases, either in the gaseous or liquid state, are withdrawn from the upper portion of separator 44 via conduit 47 and passed into conduit 22 for dehydration in either dehydrator 24 or 28 as previously described.

In another frequently preferred embodiment of the invention, wherein it is desired to provide maximum control on and maintain substantially constant the temperature of the regeneration gases in conduit 14, means are provided for maintaining the temperature of the compressed gas in discharge conduit 12 substantially constant by controlling the temperature of the gases in intake conduit 10 being introduced into compressor 11. In many instances the volume of gases available at the source (conduit 10) will be essentially constant but there will be substantial variation in the temperature of said gases. For example, when compressing air from the atmosphere the volume available is essentially constant but there can be substantial variations in the temperature of the air as in the difference between winter operations when the air can be at 0° F., or lower, and summer operations when the air can be at 100° F., or higher. In compressing gases the temperature of the gases at the intake of the compressor greatly influences the temperature of the discharged gases. When the volume of gases being compressed is essentially constant, it is possible to control the temperature of the discharge gases when said gases are being compressed to an essentially constant predetermined pressure by controlling the temperature of the intake gases. Thus, in this embodiment of the invention, the gases to be treated are passed from conduit 10 through conduit 51, heat exchanger 52, conduit 53, separator 54, and conduit 56 back into said conduit 10 downstream of valve 57. Said heat exchanger means 52 can be either a cooling means or a heating means and a suitable heat exchange medium is passed therethrough from conduit 58 having flow control valve 59 disposed therein. Said flow control valve 59 is operatively connected to temperature controller 61 through the transmission means indicated and said temperature controller is in turn operatively connected to a temperature sensing device, such as a thermocouple, positioned in said discharge conduit 12.

The following example will serve to further illustrate the invention.

*Example*

In this example air is compressed from the atmosphere for subsequent utilization as instrument air. Compressor 11 takes suction from the atmosphere through conduit 10. Said air is at atmospheric temperature of 90° F. Said air is compressed to a pressure of 60 p.s.i.a. and the temperature of the compressed air in discharge conduit 12 is 360° F. Twenty percent by volume of the hot compressed air in discharge conduit 12 is passed as regeneration gas through conduits 14, 31, and 32 into dehydrator 28 containing spent or moisture-laden bauxite desiccant which has previously been utilized to dehydrate a stream of air from conduit 22. The volume of regeneration gas passing through conduit 14 is maintained constant by means of rate of flow controller 37 and flow control valve 36. The remainder of the compressed air in discharge conduit 12 is passed through said valve 36, cooler 16, separator 18, and conduits 21, 22, and 23 into dehydrator 24 for dehydration by contacting active bauxite desiccant. The regeneration gases passed through dehydrator 28 are withdrawn therefrom via conduit 33 and passed via conduit 34 and returned to conduit 13 where it is combined with said process stream and passed therewith into dehydrator 24 as previously described. Dehydrated product gas having a dew point below about −40° F. at system operating pressure is withdrawn from dehydrator 24 via conduits 26 and 27 as product of the process.

During the time dehydrator 24 containing active desiccant is on-stream, the spent or moisture-laden desiccant in dehydrator 28 is regenerated by means of the regeneration gas being passed therethrough as previously described. The system is designed for about 12 hours operation of a dehydrator in active dehydration processing. The regeneration time of a spent bauxite desiccant in dehydrator 28 is about 8 to 10 hours including the time for cooling the hot regenerated desiccant. In the regeneration of the spent desiccant in dehydrator 28, after about 4 to 5 hours of passing hot regeneration gas thereto and passing the effluent gases therefrom into separator 18 as described, it is noted there is a very substantial decrease in the amount of water being withdrawn from separator 18 via conduit 19, indicating that water removal from the desiccant in dehydrator 28 is complete. At this time valves 62 and 63 are opened, valve 64 in conduit 14 is closed, and the hot regeneration gas is passed through cooler 66 and separator 67 and cool gas is returned to said conduit 14 downstream of said valve 64. The cooled gases are passed through dehydrator 28 for a period of 3 to 4 hours to reduce same to operating temperature. If desired, and time permits, when the water has been desorbed from the bauxite in dehydrator 28 cooling of the regeneration gas can be omitted and flow of said gas stopped and the reactivated desiccant in dehydrator 28 permitted to cool down without circulation of gas therethrough.

After about 12 hours on-stream it is found that the dehydrated product gases from dehydrator 24 contain more than the desired minimum amount of water and the process stream is then switched into dehydrator 28, after which the spent desiccant in dehydrator 24 is regenerated as described.

Materials of construction of the apparatus may be selected from among those commercially available since special problems do not ordinarily exist unless the gas being treated is corrosive. Many recording devices, flow meters and the like, are not shown or described for purposes of simplicity. The installation and use of such auxiliary equipment is well known in the art.

While the invention has been described with specific reference to preferred operating conditions and specific materials, it will be understood that the application of the invention is of broad scope. Various modifications of alternating process and regeneration flow and directing the gases to contact zones may become apparent to those skilled in the art in view of this disclosure without departing from the scope of the invention. The invention is equally applicable to two contact zones as well as more than two contact zones, and various types of valves and

I claim:

1. In a method for regenerating a moisture-laden desiccant wherein a stream of a gas is heated by application of external heat thereto, said heated gas is passed through body of said moisture-laden desiccant for a period of time sufficient to heat same to a temperature above its moisture desorbing temperature and effect a regeneration thereof, and said desiccant is thereafter cooled, the improvement comprising: compressing said gas having a temperature substantially below 250° F. to a pressure such that the resulting compressed gas has a temperature within the range of from 250 to 600° F.; and utilizing said heat of compression generated during compression of said gas as the sole source of heat in effecting said regeneration.

2. A method for regenerating a moisture-laden desiccant, which method comprises: compressing a gas having a temperature substantially below 250° F. to a pressure such that the compressed gas has a temperature within the range of from 250 to 600° F.; passing at least a portion of said compressed gas through a body of said moisture-laden desiccant for a period of time sufficient to heat same to a temperature above its moisture desorbing temperature and effect a regeneration thereof, said heat of compression generated during compression of said gas being the sole source of heat added in effecting said regeneration; and thereafter cooling said desiccant.

3. A process for the dehydration of a gas, wherein at least two dehydration zones are employed, which process comprises: compressing said gas having a temperature substantially below 250° F. in a first compressor to a pressure such that the temperature of the compressed gas is within the range of from 250 to 600° F.; passing a portion of said hot compressed gas through a first dehydration zone containing a body of moisture-laden desiccant for a period of time sufficient to heat same to a temperature above its moisture desorbing temperature and effect a regeneration thereof, said heat of compression generated during compression of said gas being the sole source of heat added in effecting said regeneration; combining moisture-laden gas withdrawn from said first dehydration zone with the remainder of said compressed gas and passing the combined stream through a cooler to condense moisture therefrom; passing the effluent from said cooler to a separation zone and therein separating condensed moisture from said effluent; and passing gaseous effluent from said separation zone through a second dehydration zone, containing active desiccant, to at least partially dehydrate same.

4. A process for the dehydration of a gas, wherein at least two dehydration zones are employed, which process comprises: compressing said gas in a first compressor to a pressure such that the resulting compressed gas has a temperature within the range of from 250 to 600° F.; passing a portion of said hot compressed gas through a first dehydration zone containing a body of moisture-laden desiccant for a period of time sufficient to heat same to a temperature above its moisture desorbing temperature and effect a regeneration thereof; combining moisture-laden gas withdrawn from said first dehydration zone with the remainder of said compressed gas and passing the combined stream through a first cooler to condense moisture therefrom; passing the effluent from said first cooler to a first separation zone and therein separating condensed moisture from said effluent; passing gaseous effluent from said first separation zone into a second compressor and therein compressing same; passing the fluid discharged from said second compressor through a second cooler; passing the fluid effluent from said second cooler to a second separation zone and therein separating condensed water from the remaining fluid; and passing said remaining fluid from said second separation zone through a second dehydration zone, containing active desiccant, to at least partially dehydrate same.

5. A process for the dehydration of a gas, wherein at least two dehydration zones are employed, which process comprises: compressing said gas in a first compressor to a pressure such that the resulting compressed gas has a temperature within the range of from 250 to 600° F.; passing a portion of said hot compressed gas through a first dehydration zone containing a body of moisture-laden desiccant for a period of time sufficient to heat same to a temperature above its moisture desorbing temperature and effect a regeneration thereof; combining moisture-laden gas withdrawn from said first dehydration zone with the remainder of said compressed gas and passing the combined stream through a first cooler to condense moisture therefrom; passing the effluent from said first cooler to a first separation zone and therein separating condensed moisture from said effluent; passing gaseous effluent from said first separation zone into a second compressor and therein compressing same to a desired higher operating pressure insufficient to liquefy same; passing compressed gas from said second compressor through a second cooler; passing gaseous effluent from said second cooler through a second separation zone and therein separating condensed water; and passing gaseous effluent from said second separation zone through a second dehydration zone, containing active desiccant, to at least partially dehydrate same.

6. A process for the dehydration of a gas, wherein at least two dehydration zones are employed, which process comprises: compressing said gas in a first compressor to a pressure such that the resulting compressed gas has a temperature within the range of from 250 to 600° F.; passing a portion of said hot compressed gas through a first dehydration zone containing a body of moisture-laden desiccant for a period of time sufficient to heat same to a temperature above its moisture desorbing temperature and effect a regeneration of same; combining moisture-laden gas withdrawn from said first dehydration zone with the remainder of said compressed gas and passing the combined stream through a first cooler to condense moisture therefrom; passing the effluent from said first cooler to a first separation zone and therein separating condensed moisture from said effluent; passing gaseous effluent from said first separation zone into a second compressor and therein compressing same to a pressure sufficient to liquefy same; passing the liquid discharged from said second compression through a second cooler; passing effluent from said second cooler through a second separation zone and therein separating condensed water from the remaining liquid; and passing said remaining liquid from said second separation zone through a second dehydration zone, containing active desiccant, to at least partially dehydrate same.

7. A process for dehydrating a non-aqueous gas containing water vapor, which process comprises: compressing a stream of said gas having a temperature substantially below 250° F. to a pressure such that the resulting compressed gas stream has a temperature within the range of from 250 to 600° F.; dividing said hot compressed gas stream into a major portion and a minor portion; reducing the pressure on said major stream to a pressure not greater than that of a cooled regeneration effluent gas as hereinafter recited and varying the extent of said pressure reduction in conjunction with the rate of flow of said minor stream to maintain said rate of flow constant; passing said constant volume stream through a bed of moisture-laden solid granular adsorbent and effecting a regeneration thereof, said heat of compression generated during compression of said gas being the sole source of heat added in effecting said regeneration; mixing the resulting gaseous regeneration effluent with said major stream of reduced pressure and passing the combined streams through a cooler; removing from said cooled combined streams resulting condensed liquid water; and subsequently passing the combined streams through a bed of solid granular water-adsorbent material; and recovering a resulting stream of dried gas having a pressure less than and a quantity equal to the first said stream of gas.

8. A process for dehydrating a non-aqueous gas containing water vapor, which process comprises: passing a stream of said gas through an intake conduit to a compressor; compressing said gas having a temperature substantially below 250° F. to a pressure such that the resulting compressed gas has a temperature within the range of from 250 to 600° F.; maintaining the temperature of said compressed gas substantially constant by controlling the temperature of said intake gas responsive to the temperature of said compressed gas; dividing said hot compressed gas stream into a major portion and a minor portion; reducing the pressure on said major stream to a pressure not greater than that of a cooled regeneration effluent gas as hereinafter recited and varying the extent of said pressure reduction in conjunction with the rate of flow of said minor stream to maintain said rate of flow constant; passing said constant volume stream through a bed of moisture-laden solid granular adsorbent and effecting a regeneration thereof, said heat of compression generated during compression of said gas being the sole source of heat added in effecting said regeneration; mixing the resulting gaseous regeneration effluent with said major stream of reduced pressure and passing the combined streams through a cooler; removing from said cooled combined streams resulting condensed liquid water; and subsequently passing the combined streams through a bed of solid granular water-adsorbent material, and recovering a resulting stream of dried gas having a pressure less than and a quantity equal to the first said stream of gas.

9. Apparatus for the dehydration of a gas, comprising, in combination: a compressor; a gas intake conduit connected to said compressor; a compressed gas discharge conduit connected to said compressor; means for maintaining the temperature of the gas in said discharge conduit substantially constant by controlling the temperature of the gas in said intake conduit; a plurality of dehydrator vessels; main flow conduit means connecting said discharge conduit and the inlet of each of said dehydrator vessels; cooling means disposed in said main flow conduit; regeneration gas conduit means connecting said discharge conduit and the inlet of each of said dehydrator vessels; flow control means for maintaining constant the amount of regeneration gas flowing through said regeneration gas conduit means; regeneration gas effluent conduit means connected to the outlet of each of said dehydrator vessels and connected to said main flow conduit upstream of said cooling means; and a product conduit connected to the outlet of each of said dehydrator vessels.

10. Apparatus for the dehydration of a gas, comprising, in combination: a first compressor; a gas intake conduit connected to said first compressor; a compressed gas discharge conduit connected to said first compressor; means for maintaining the temperature of the gas in said discharge conduit substantially constant by controlling the temperature of the gas in said intake conduit; a plurality of dehydrator vessels; main flow conduit means connecting said discharge conduit and the inlet of each of said dehydrator vessels; first cooling means disposed in said main flow conduit; regeneration gas conduit means connecting said discharge conduit and the inlet of each of said dehydrator vessels; flow control means for maintaining constant the amount of regeneration gas flowing through said regeneration gas conduit means; regeneration gas effluent conduit means connected to the outlet of each of said dehydrator vessels and connected to said main flow conduit upstream of said first cooling means; a second compressor disposed in said main flow conduit means downstream from said first cooling means; a second cooling means disposed in said main flow conduit means downstream from said second compressor; and a product conduit connected to the outlet of each of said dehydrator vessels.

References Cited by the Examiner

UNITED STATES PATENTS

| 2,629,460 | 2/53 | Maki | 55—33 |
| 3,008,539 | 11/61 | Francis | 55—62 |

REUBEN FRIEDMAN, *Primary Examiner.*